(12) United States Patent
Taga et al.

(10) Patent No.: US 9,634,503 B2
(45) Date of Patent: Apr. 25, 2017

(54) BATTERY CHARGERS

(71) Applicant: MAKITA CORPORATION, Anjo-shi, Aichi (JP)

(72) Inventors: Hideyuki Taga, Anjo (JP); Yasuhiro Tabuchi, Anjo (JP); Mamoru Sakai, Anjo (JP); Akira Naito, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 133 days.

(21) Appl. No.: 14/625,000

(22) Filed: Feb. 18, 2015

(65) Prior Publication Data

US 2015/0244197 A1  Aug. 27, 2015

(30) Foreign Application Priority Data

Feb. 26, 2014 (JP) ................ 2014-035709
Feb. 26, 2014 (JP) ................ 2014-035710

(51) Int. Cl.
*H02J 7/00* (2006.01)
*H02J 7/02* (2016.01)

(52) U.S. Cl.
CPC .......... *H02J 7/0045* (2013.01); *H02J 7/0042* (2013.01); *H02J 7/0068* (2013.01); *H02J 7/02* (2013.01)

(58) Field of Classification Search
CPC ................... H02J 7/0045; H02J 7/02
USPC .................................. 320/113, 115
See application file for complete search history.

(56) References Cited

U.S. PATENT DOCUMENTS

| | | | | |
|---|---|---|---|---|
| 7,573,229 B2 * | 8/2009 | Arakelian | ........... | H01M 2/1072 320/107 |
| 8,018,198 B2 * | 9/2011 | Meyer | ........... | H02J 7/0004 320/125 |
| 8,436,576 B2 * | 5/2013 | Toya | ........... | H01M 2/1022 320/108 |
| 8,928,276 B2 * | 1/2015 | Kesler | ........... | 307/104 |
| 9,337,453 B2 * | 5/2016 | Ogura | ........... | H01M 2/08 |
| 2005/0116684 A1 * | 6/2005 | Kim | ........... | B60R 11/0241 320/114 |
| 2007/0279002 A1 * | 12/2007 | Partovi | ........... | H02J 7/0027 320/115 |
| 2009/0267560 A1 * | 10/2009 | Toya | ........... | H01M 2/1022 320/108 |
| 2011/0101912 A1 | 5/2011 | Goto et al. | | |
| 2012/0208048 A1 * | 8/2012 | Ogura | ........... | H01M 2/1022 429/7 |
| 2014/0028243 A1 * | 1/2014 | Rayner | ........... | G06F 1/163 320/103 |

FOREIGN PATENT DOCUMENTS

| | | |
|---|---|---|
| JP | 2009296724 A | 12/2009 |
| JP | 2011097508 A | 5/2011 |
| WO | 2013190955 A1 | 12/2013 |

* cited by examiner

*Primary Examiner* — M'Baye Diao
(74) *Attorney, Agent, or Firm* — Oliff PLC

(57) ABSTRACT

In one aspect according to the present teachings, a battery charger may include a body housing and a power supply connector disposed at a lateral side of the body housing. The power supply connector can supply a DC power to an external device.

22 Claims, 7 Drawing Sheets

BATTERY CHARGERS

This application claims priorities to Japanese patent application serial numbers 2014-035709 and 2014-035710, the contents of which are incorporated herein by reference.

BACKGROUND OF THE INVENTION

Field of the Invention

Embodiments of the present disclosure relate to battery chargers usable, for example, for charging battery packs that can be used as power sources of electric tools such as electric screwdrivers.

Description of the Related Art

Battery packs for electric tools are known that can be repeatedly used by being recharged by battery chargers after being removed from the electric tools. Various improvements for the battery chargers have been proposed for providing additional functions than a function of recharging the battery packs.

US2011/0101912A1 (also published as Japanese Laid-Open Patent Publication No. 2011-97508) discloses a battery charger having a function of recharging a cellular phone in addition to a function of recharging a battery pack. The battery charger of this document is also provided with a service outlet for outputting an AC 100V.

Japanese Laid-Open Patent Publication No. 2009-296724 and International Publication No. WO2013/190955 propose battery chargers that can be hung on a wall. In particular, Japanese Laid-Open Patent Publication No. 2009-29672 proposes techniques for improving the usability of the battery pack in relation to the operations for mounting the battery pack to the wall and for removing the battery pack from the wall. International Publication No. WO2013/190955 proposes techniques for ensuring that the hanging operation of the battery charger can be reliably performed and for improving the battery charger in terms of ease of handling when the battery charger is carried about.

However, there has been a need in the art for battery chargers that are further improved in terms of their functions.

SUMMARY OF THE INVENTION

In one aspect according to the present teachings, a battery charger usable for recharging a battery pack may include a body housing, a battery mount portion and a power supply connector. The body housing may include an upper side, a lower side, and a lateral side. The battery mount portion disposed at the upper side of the body housing. The battery mount portion is configured such that (a) the battery pack is moved relative to the battery mount portion in a battery mounting direction for mounting to the battery mount portion, and (b) the battery pack is moved relative to the battery mount portion in a removing direction for removing from the battery mount portion. The power supply connector may be capable of outputting a DC electric power and may be disposed at the lateral side of the battery housing at at least one of a first position on the side of the mounting direction and a second position on the side of the removing direction.

Normally, in order to mount and remove the battery pack, the user may be positioned to face a part of the lateral side of the battery charger. Therefore, with the arrangement of the power supply connector at the lateral side of the battery housing at at least one of a first position on the side of the mounting direction and a second position on the side of the removing direction, the user can easily connect and disconnect an external device to and from the power supply connector. As a result, the battery charger can be improved in its usability or operability.

The battery mount portion may be configured such that the battery pack is mounted to and removed from the battery mount portion as the battery pack moves in the mounting direction and the removing direction along the upper side of the battery pack.

The mounting direction and the removing directions may be opposite to each other. With this arrangement, the battery charger can be improved in its usability or operability in terms of ease of mounting and removing the battery pack.

In this connection, the power supply connector may be disposed at the first position on the side of the mounting direction. With this arrangement, the user can mount the battery pack to the battery mount portion by moving the battery pack toward the side of the user, while the user is positioned to face the first position of the lateral surface where the power supply connector is disposed.

The battery charger may further include an AC power cord extending outward from the body housing. The power supply connector may be located proximal to the AC power cord with respect to a direction along one of the first lateral side and the second lateral side of the body housing.

The battery charger may further include an AC power cord extending outward from the body housing. In the case that the power supply connector is disposed at the first position, the first position may be determined to be proximal to the AC power cord with respect to a direction perpendicular to the mounting direction of the battery pack. In the case that the power supply connector is disposed at the second position, the second position may be determined to be proximal to the AC power cord with respect to a direction perpendicular to the removing direction of the battery pack.

In general, the battery charger may include a power source circuit connected between the AC power cord and the power supply connector. Therefore, by positioning the power supply connector proximal to the AC power cord, it may be possible to minimize a length of a necessary wiring line for connecting the power supply connector to the power source circuit. Hence, the wiring necessary for the power supply connector can be simplified. For example, in the case that the power supply connector is disposed at the front side of the body housing and that the AC power cord extends from the right side of the body housing, the electric connector may be located at a position nearer to the right end of the front side than the left end thereof.

The body housing may include an upper housing and a lower housing formed joined together at a joint plane. The power supply connector may be disposed proximal to or across the joint plane in the vertical direction. With this arrangement, it may be possible to easily assemble the power supply connector with the body housing.

In another aspect according to the present teachings, a battery charger usable for recharging a batter pack may include a body housing, a power source circuit board disposed within the body housing, and a power supply connector disposed within the body housing at a position spaced from the power source circuit board. A circuit board accommodation space and a connector accommodation space may be defined in the body housing. The circuit board accommodation space may accommodate the power source circuit board. The connector accommodation space may accommodate the power supply connector. A waterproof wall portion may be disposed within the body housing. The waterproof wall portion may be configured to partition between the circuit board accommodation space and the body housing accommodation space.

With this arrangement, the power supply connector of the battery charger can supply a power source to an external device by connecting a power connector of the external device to the power supply connector of the battery charger. With the power source circuit board disposed within the circuit board accommodation space that is partitioned from the connector accommodation space by the waterproof wall portion, it may be possible to inhibit water from entering into the circuit board accommodation space even in the case that water has accidentally entered into the connector accommodation space via the power supply connector. In this way, it is possible to inhibit the power source circuit board from getting wet with water.

The body housing may include an upper housing and a lower housing joined together to form the body housing. The waterproof wall portion may include an upper waterproof wall portion disposed at the upper housing and a lower waterproof wall portion disposed at the lower housing. At least a part of the upper waterproof wall portion and at least a part of the lower waterproof wall portion may be overlapped with each other in a vertical direction.

With this arrangement, it is possible to further ensure that water may not enter the circuit board accommodation space from the connector accommodation space.

A water discharge hole may be formed in a part of the body housing defining a bottom of the connector accommodation space. With this arrangement, even in the case that water has entered into the connector accommodation space, such water may be discharged to the outside via the water discharge hole. Therefore, it is possible to further ensure that water may not enter into the circuit board accommodation space from the connector accommodation space.

The battery charger may further include a waterproof cap. The waterproof cap may include a body portion capable of closing the power supply connector in a water-tight manner and a support portion configured to support the body portion with respect to the body housing. The support portion may be inserted into a support hole formed in the body housing to extend therethrough. The support portion may include an outer seal portion and an inner seal portion configured to engage the support hole from an outer side and an inner side of the support hole so as to close the support hole in a water-tight manner.

With this arrangement, the waterproof cap may inhibit the power supply connector from getting wetted with water. In addition, because the outer seal portion and the inner seal portion of the support portion may engage the support hole from an outer side and an inner side of the support hole, it may be possible to prevent the waterproof cap from being accidentally removed from the body housing. Further, it may be possible to ensure that water may not enter into the body housing via the support hole. In this way, it may be possible to further enhance the waterproof function of the battery charger.

The body housing may include an outer side recess and an inner side recess respectively formed along an outer side open edge and an inner side open edge of the support hole. The outer side recess and the inner side recess may be configured to be respectively fitted with the outer seal portion and the inner seal portion of the support portion.

With this arrangement, the contact areas of the outer seal portion and the inner seal portion with the body housing around the support hole can be increased. Therefore, the waterproof function of the battery charger can be further enhanced in this respect.

At least the support portion of the waterproof cap may have elasticity. With this arrangement, the outer seal portion and the inner seal portion of the support portion can elastically engage the support hole from an outer side and an inner side of the support hole. Therefore, the waterproof function for the support hole can be further enhanced. In addition, due to the elastic deformation of the support portion, the support portion can be easily engaged with and disengaged from the support hole. In this way, the waterproof cap can be easily assemble with and disassembled from the body housing.

The support hole may be formed in communication with the connector accommodation space. With this arrangement, even in the case that water has entered into the connector accommodation space via the support hole, such water may be prevented from entering further into the circuit board accommodation space by the waterproof wall portion. In one aspect according to the present teachings, a battery charger may include a power supply connector that can supply a DC power to an external device.

DETAILED DESCRIPTION OF THE INVENTION

Embodiments will now be described with reference to the drawings.

[First Embodiment]

Figure 1:
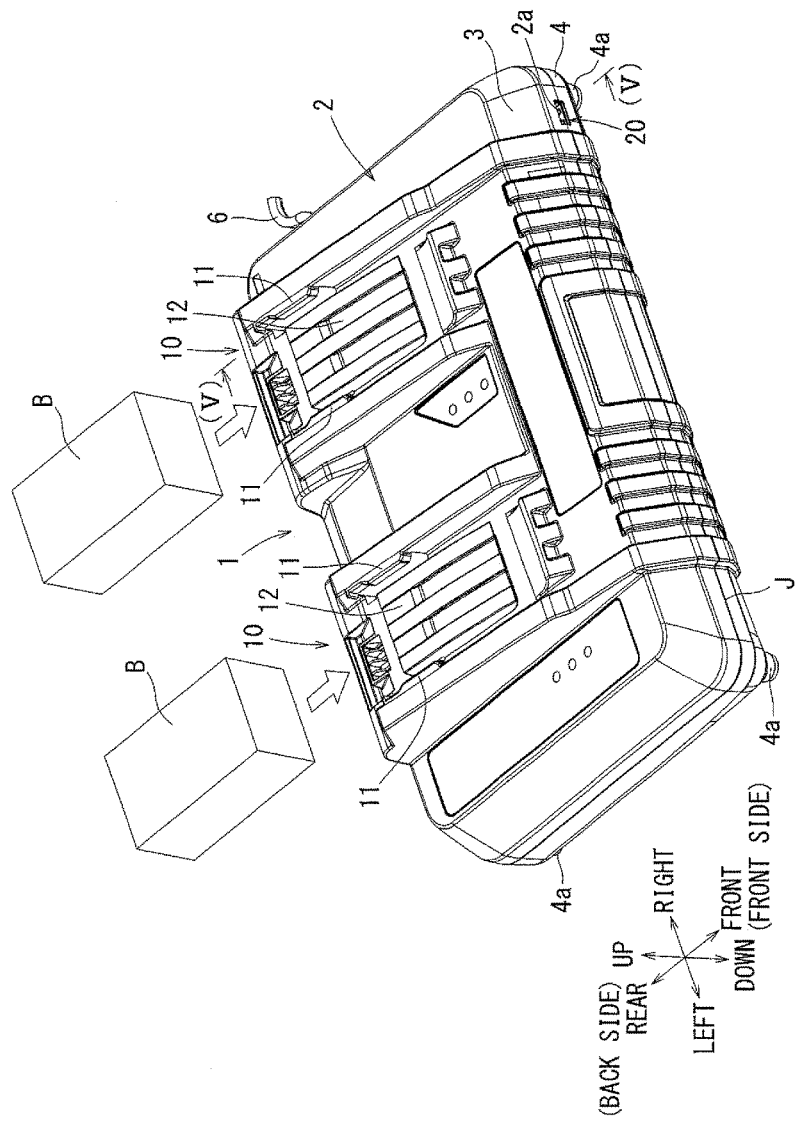
FIG. 1 is a perspective view of a battery charger designed for simultaneously recharging two battery packs according to a first embodiment.

A first embodiment will now be described with reference to FIGS. 1 to 5. As shown in FIG. 1, a battery charger 1 may be designed so as to be capable of simultaneously recharging two battery packs B. For mounting the batteries B to the battery charger 1, the user may be positioned on one side of the battery charger 1. For the purpose of explanation, the front side, rear side, left side, right side, upper side and lower side will be determined with reference to a position that may be normally taken by the user for mounting the batteries B to the battery charger 1. Thus, one of the sides of the battery charger 1, to which the user may face during the mounting and removing operations may be called a front side, and the side opposite to the front side may be called a rear side or a back side.

Two battery mount portions 10 may be disposed at the upper side of the battery charger 1 and may be arranged parallel to each other in right and left directions. The battery mount portions 10 may be configured to have the same construction. Therefore, only one of the battery mount portions 10 may be described. The battery mount portion 10 may be configured to be capable of mounting the battery pack B as the battery pack B is slid along the battery mount portion 10. To this end, the battery mount portion 10 may include a pair of right and left slide rails 11. More specifically, the battery pack B can be mounted to the battery mount portion 10 as the battery pack B is slid forwardly along the pair of right and left slide rails 11 in a direction as indicted by an outline arrow in FIG. 1.

A terminal cover 12 may be disposed between the right and left slide rails 11 so as to be slidable in front and rear directions. A spring (not shown) may bias the terminal cover 12 in the rear direction that is a closing direction of the terminal cover 12. When the terminal cover 12 is moved in the front direction against the biasing force of the spring, terminals (not shown) may be exposed to the outside for electrically connecting with corresponding terminals (not shown) of the battery pack B. More specifically, when the battery pack B is slid in the front direction along the pair of right and left slide rails 11, the terminal cover 12 may be pushed in the front direction by the battery pack B. Thus, as the battery pack B is slid in a battery mount direction that is the front direction indicated by the outline arrow, the terminals exposed to the outside from the terminal cover 12 may be electrically connected to the corresponding terminals (e.g., a positive terminal and a negative terminal) of the battery pack B.

The battery charger 1 may include a body housing 2. The body housing 2 may have a substantially flat box shape. The body housing 2 may include an upper housing 3 and a lower housing 4 (housing halves) formed separately from each other and joined together at a joint plane J shown in FIGS. 1 to 4 to form the body housing 2. Four legs 4a may extend downward from four corner portions of the lower side of the lower housing 4 for placement of the battery charger 1 on an installation surface (not shown). A power supply connecter 20 may be disposed at the front side of the body housing 2 at a position near the right end of the front side. The power supply connector 20 may be designed such that a power cord of an external device, such as a portable music player and a cellular phone (not shown), can be connected to the power supply connector 20. Therefore, the external device can receive a supply of electric power from the battery charger 1. For example, the electric power supplied to the external device may be used for the operation of the external device or for recharging a battery of the external device. In this embodiment, the battery charger 1 is designed for supplying a DC power (e.g., DC 5V) to the external device. The power supply connector 20 may be a USB (Universal Serial Bus) connector having a type-A female terminal. As will be explained later, a waterproof structure may be provided for the power supply connector 20.

Figure 2:
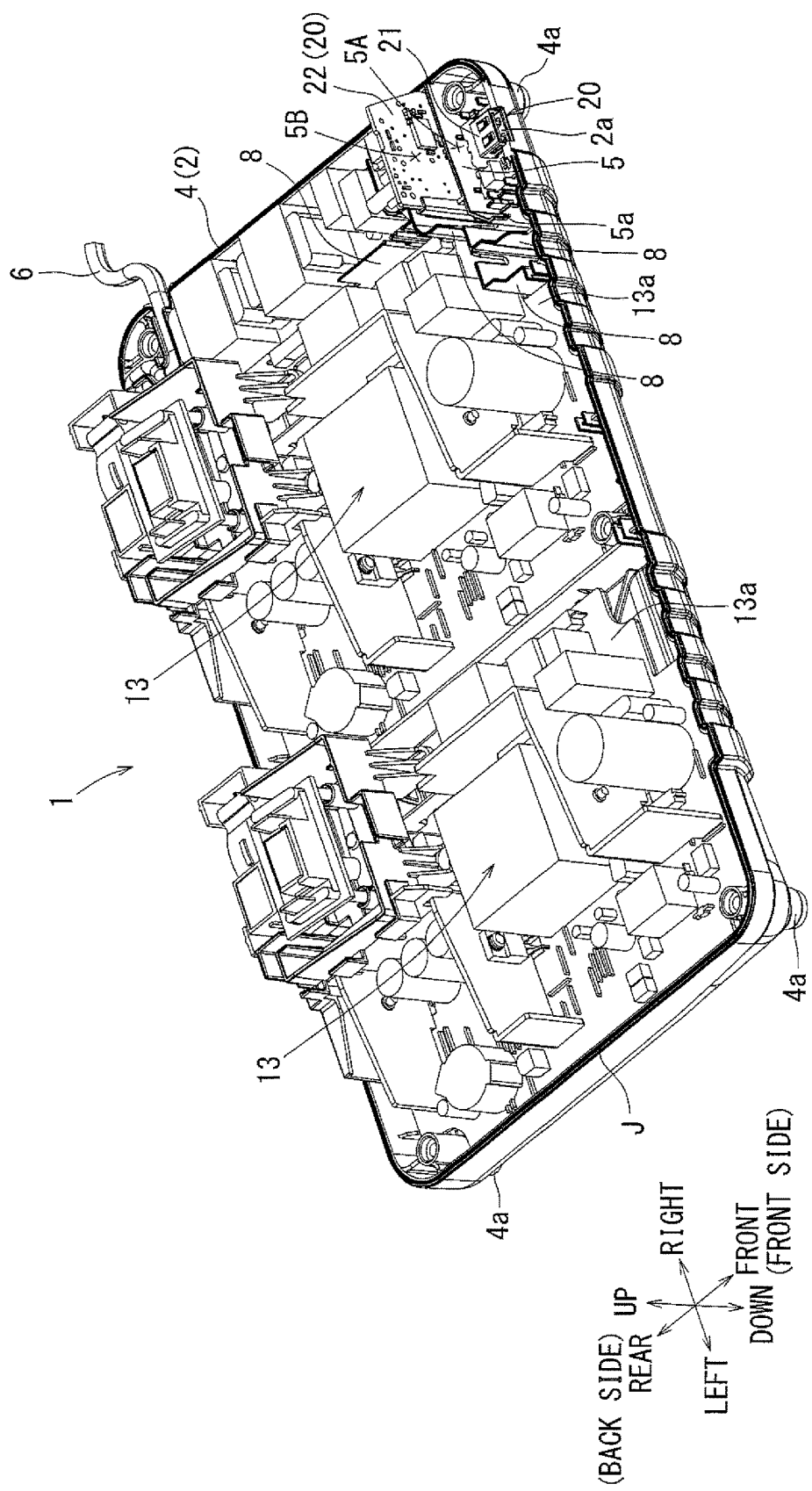
FIG. 2 is a perspective view of the battery charger with an upper housing removed.
Figure 3:
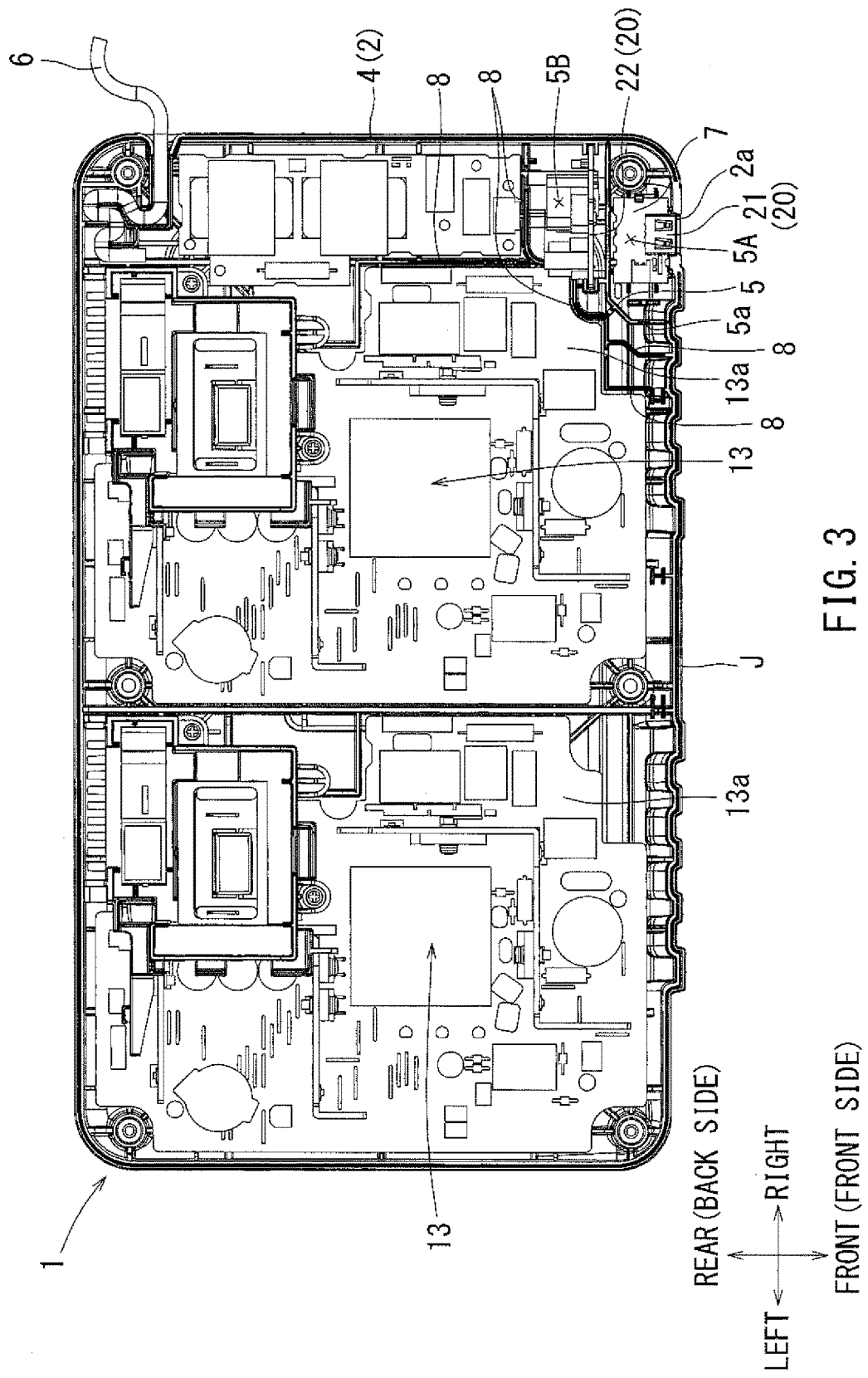
FIG. 3 is a plan view of the battery charger with the upper housing removed.

FIGS. 2 and 3 show the battery charger 1 with the upper housing 3 removed to show the internal structure of the battery charger 1. Two charge controllers 13 may be mounted within the lower housing 4 in association with the two battery mount portions 10. Each of the charge controllers 13 may include a control circuit board 13a on which various electronic devices may be mounted for performing various functions relating to the recharging operation. A power cord 6 may be inserted into the lower housing 4 from the right side thereof, so that an electric power, such as AC 100V, can be supplied to the battery charger 1 from a commercially available power source (not shown).

Figure 4:
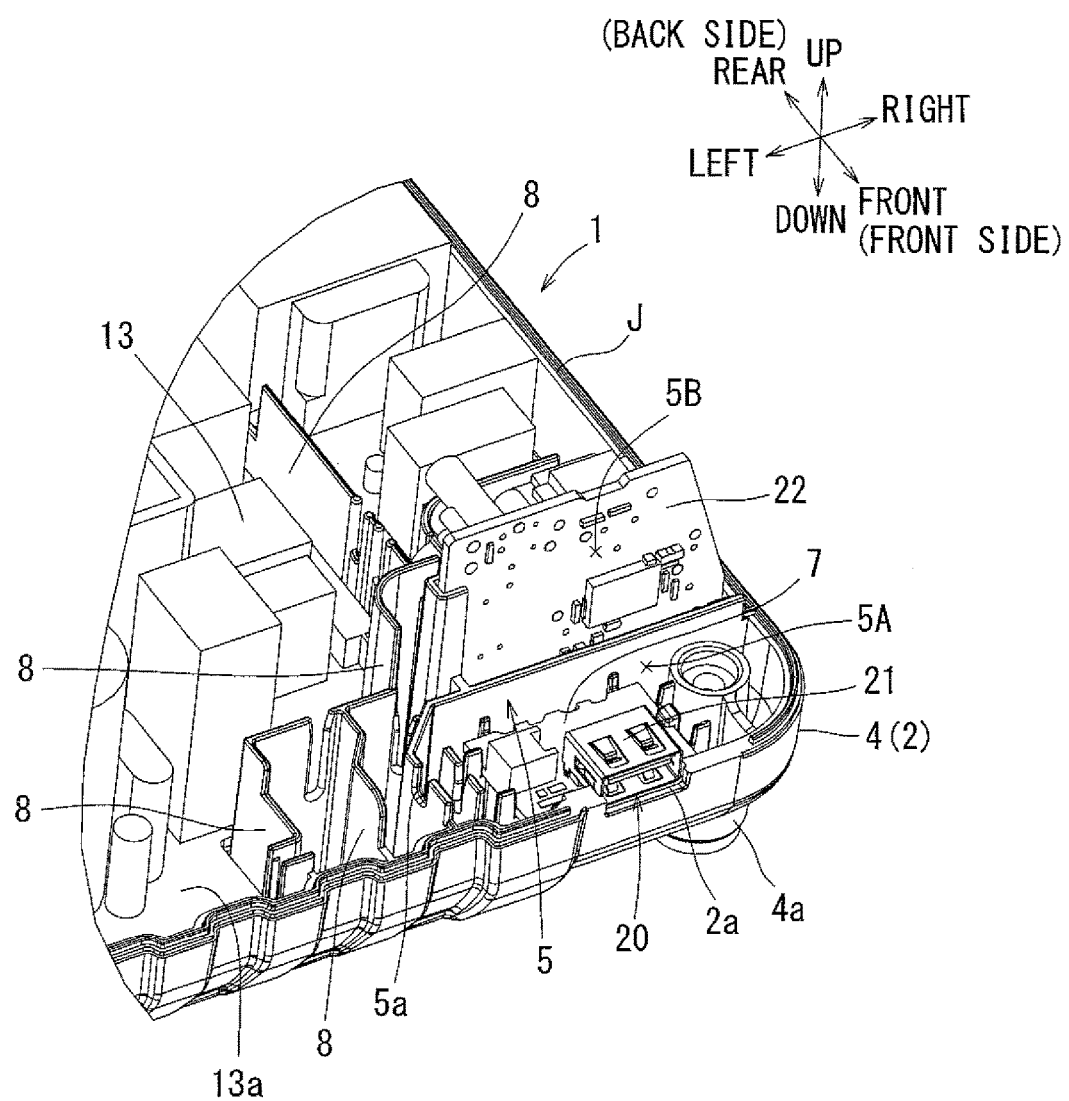
FIG. 4 is a perspective view of a part of the battery charger with the upper housing removed and showing a power supply connector and its peripheral devices.
Figure 5:
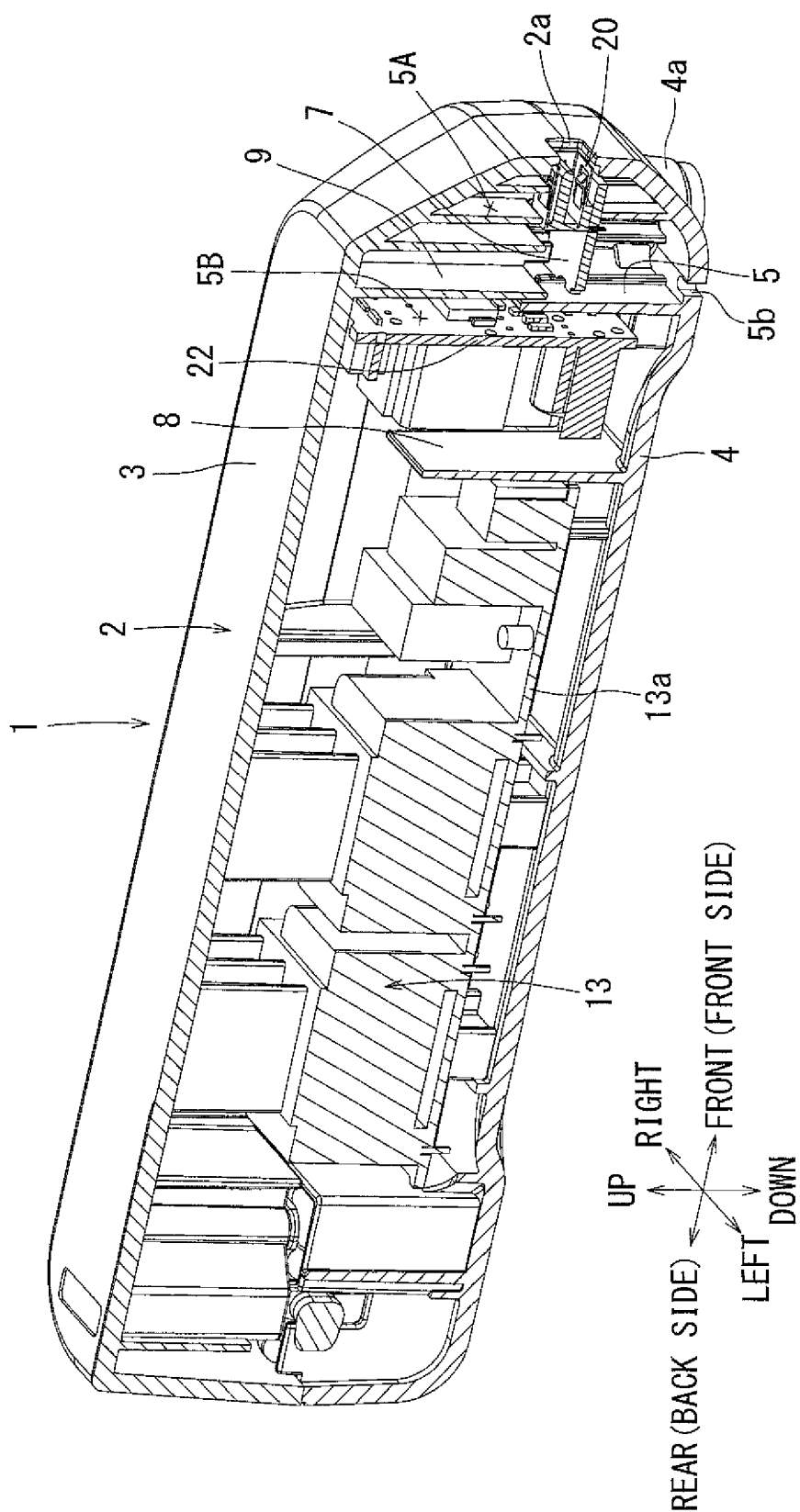
FIG. 5 is a vertical sectional view of the battery charger taken along line (V)-(V) in FIG. 1.

As shown in FIGS. 4 and 5, the power supply connector 20 may include a connector body 21 and a power source circuit board 22. The power source circuit board 22 may have a power source circuit mounted thereon for outputting an electric power to be supplied to the external device. The connector body 21 and the power source circuit board 22 may be spaced from each other by a given distance. The connector body 21 and the power source circuit board 22 may be electrically connected to each other via electric lines (not shown). The connector body 21 may be positioned within a connector accommodation space 5A delimited by a waterproof wall portion 5 and the right and left side walls of the lower housing 4. The connector accommodation space 5A may have a substantially rectangular shape as viewed from the upper side. The connector body 21 may be fixedly attached to a connector support plate 7. The connector support plate 7 may be fixedly mounted within the connector accommodation space 5A. The connector body 21 may have a socket portion fixedly fitted into an opening 2a formed in the front wall of the body housing 2 at a position nearer to the right side wall. The opening 2a may have a rectangular shape elongated in the right and left directions. The opening 2a may be formed to extend vertically across the joint plane J. In other words, the opening 2a may have an upper part formed in the lower portion of the upper housing 3 and a lower part formed in the upper portion of the lower housing 4.

The waterproof wall portion 5 may be molded integrally with the lower housing 4. The waterproof wall portion 5 may extend upward from the bottom surface of the lower housing 4. More specifically, the waterproof wall portion 5 may be located proximal to the right front corner portion of the lower housing 4. The waterproof wall portion 5 may have a long side portion and a short side portion that form an L-shape together as viewed in plan view. The long side portion may extend leftward from the right side wall of the lower housing 4. The short side portion may extend rearward from the front side wall of the lower housing 4 and may be joined to the left side end of the long side portion. The upper edge of the waterproof wall portion 5 may be located above the joint plane J. The waterproof wall portion 5 may serve to partition the connector accommodation area 5A from a circuit board accommodation area 5B that will be described later. The waterproof wall portion 5 may inhibit water from flowing from the connector accommodation area 5A into the circuit board accommodation area 5B or vice versa. A slot 5a may be formed in the upper portion of the short-side portion of the waterproof wall portion 5 for allowing insertion of electric lines. A water discharge hole 5b may be formed in the bottom wall of the lower housing 4 at a position within the connector accommodation space 5A as viewed in plan view. Therefore, even in the case that water has entered into the connector accommodation space 5A via the connector body 21 or the opening 2a, such water may be discharged to the outside via the water discharge hole 5b.

As shown in FIG. 5, a waterproof wall portion 9 may be formed integrally with the upper housing 3 to correspond to the waterproof wall portion 5 of the lower housing 4. The waterproof wall portion 9 may extend downward from the top surface of the upper housing 3. More specifically, similar to the waterproof wall portion 5, the waterproof wall portion 9 may be located proximal to the right front corner portion of the upper housing 3 and may have a long side portion and a short side portion that form an L-shape together as viewed in plan view. The long side portion may extend leftward from the right side wall of the upper housing 3. The short side portion may extend rearward from the front side wall of the upper housing 3 and joined to the left side end of the long side portion.

In this way, the waterproof wall portion 5 of the lower housing 4 and the waterproof wall portion 9 of the upper housing 3 may cooperate to delimit the connector accommodation space 5A that has a rectangular shape as viewed in plan view.

As shown in FIG. 5, the lower end portion of the waterproof wall portion 9 of the upper housing 3 may be overlapped with the upper end portion of the waterproof wall portion 5 of the lower housing 4 along a given distance in the vertical direction. More specifically, the lower end portion of the waterproof wall portion 9 of the upper housing 3 may be positioned on the side of the connector body 21 (i.e., the side toward the connector accommodation space 5A) with respect to the upper end portion of the waterproof wall portion 5 of the lower housing 4. In this way, the connector body 21, the waterproof wall portion 9 of the upper housing 3, and the waterproof wall portion 5 of the lower housing 4 may be arranged in this order as viewed from the side of the connector body 21. Due to overlapping of the lower end portion of the waterproof wall portion 9 of the upper housing 3 with the upper end portion of the waterproof wall portion 5 of the lower housing 4, it may be possible to ensure at the right front corner portion of the body housing 2 a highly watertight seal between the connector accommodation space 5A and the space around the connector accommodation space 5A, in particular the circuit board accommodation space 5B.

The power source circuit board 22 may be positioned within the circuit board accommodation space 5B located on the outer rear side of the connector accommodation space 5A. A plurality of partition walls 8 may be arranged on the rear side and the left side of the connector accommodation space 5A that is delimited by the waterproof wall portion 5 and the wall-proof wall portion 9 as described above. The plurality of partition walls 8 may extend upward from the bottom surface of the lower housing 4. The circuit board accommodation space 5B may be delimited by two of the plurality of partition walls 8 located on the rear side of the waterproof wall portion 5. In this way, the circuit board accommodation space 5B may be positioned next to the rear side of the connector accommodation space 5A. The power source circuit board 22 may be mounted within the circuit board accommodation space 5B so as to extend vertically therewithin. Therefore, the opposite surfaces of the power source circuit board 22 may be oriented in the vertical direction.

According to the first embodiment described above, the power supply connector 20 (e.g., a USB connector) may be disposed at the front surface of the body housing 2 at a position nearer to the right end of the front surface. Therefore, a power cord of an external device such as a portable music player may be connected to the power supply connector 20, so that the external device can receive a supply of electric power via the power supply connector 20. In this way, although the battery charger 1 may be mainly used for recharging the batteries B of the electric tool, the battery charger 1 may have an additional function as an external power output. Therefore, the usability of the battery charger 1 can be enhanced. In addition, the connector body 21 of the power supply connector 20 is located within the connector accommodation space 5A so as to be spaced from the power source circuit board 22. Because the connector accommodation space 5A is partitioned from the circuit board accommodation space 5A in a watertight manner by the waterproof wall portions 5 and 9, it may be possible to prevent water from entering from the connector accommodation space 5A into the circuit board accommodation space 5B even in the case that water has accidentally entered into the connection accommodation space 5A via the connector body 21 or the opening 2a of the body housing 2. In this way, it is possible to ensure a high-waterproof function for the power source circuit board 22 and the charge controllers 13.

[Second Embodiment]

A second embodiment will now be described with reference to FIGS. 6 to 9. The second embodiment is a modification of the first embodiment. Therefore, in FIGS. 6 to 9, like members are given the same reference numerals as the first embodiment, and the description of these members will not be repeated.

Figure 6:
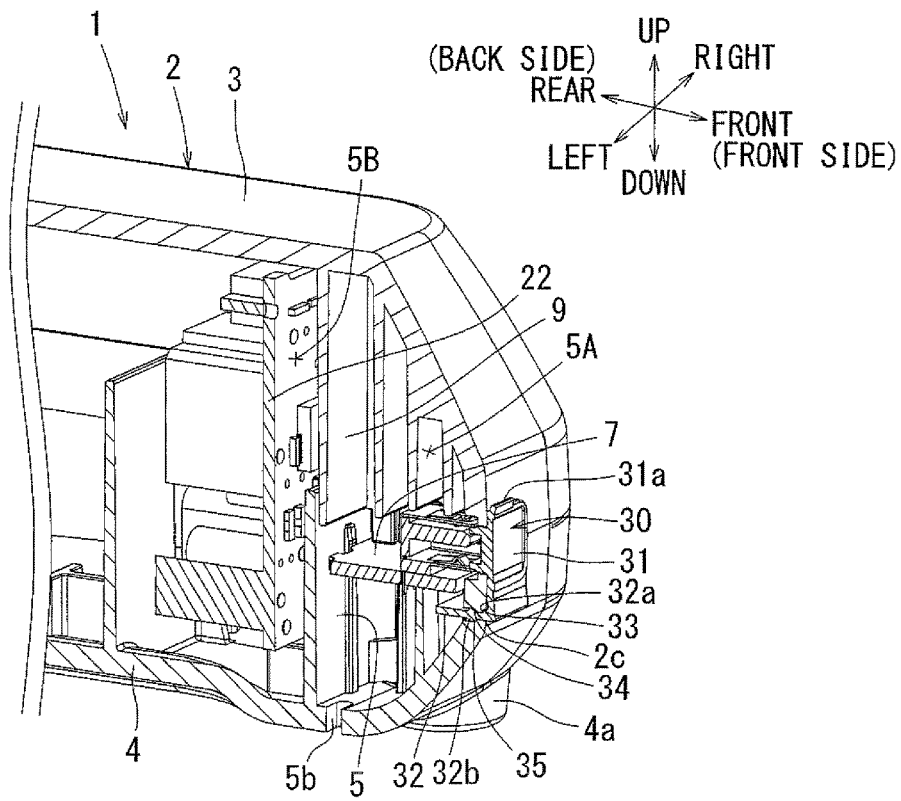
FIG. 6 is a perspective view of a part of a battery charger according to a second embodiment showing a power supply connector and its peripheral devices and also showing a waterproof cap mounted to the battery charger.
Figure 7:
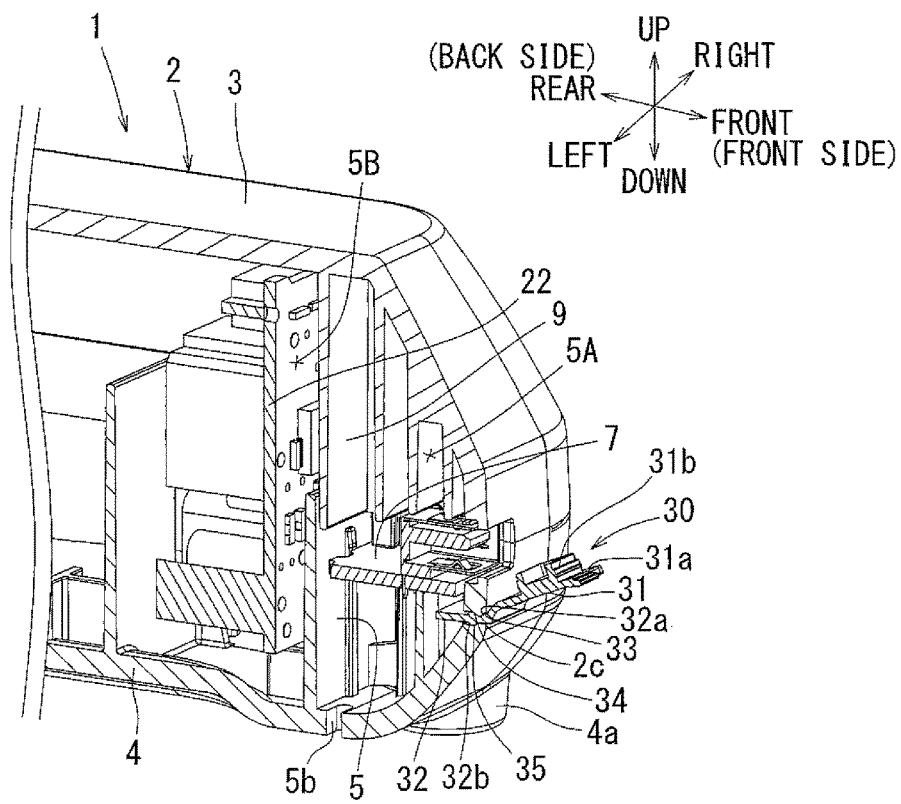
FIG. 7 is a perspective view similar to FIG. 6 but showing the state where a body portion of the waterproof cap has been removed from the power supply connector.
Figure 8:
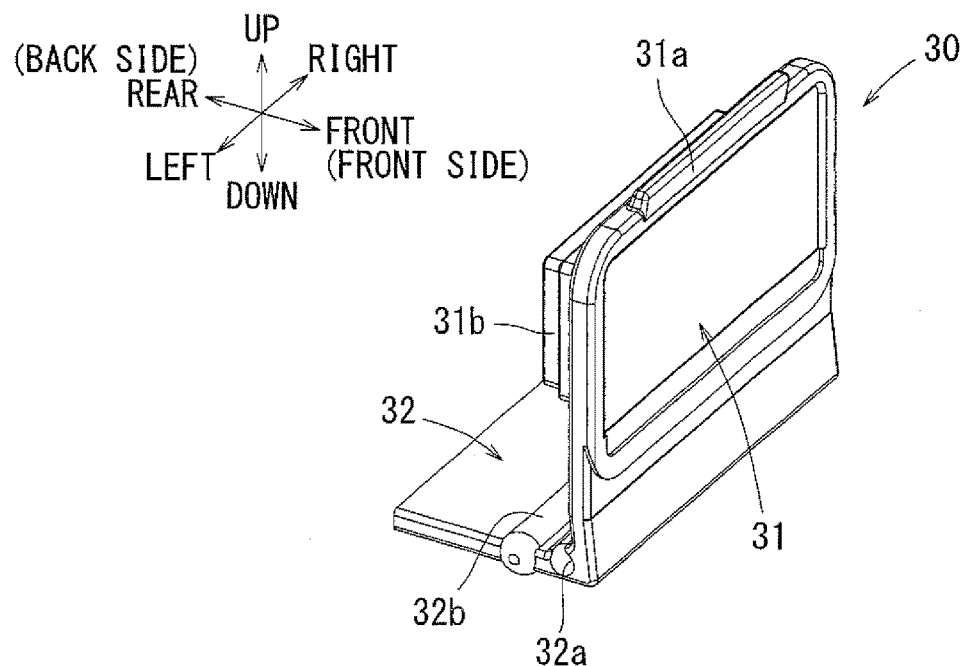
FIG. 8 is a front-side perspective view of the waterproof cap.
Figure 9:
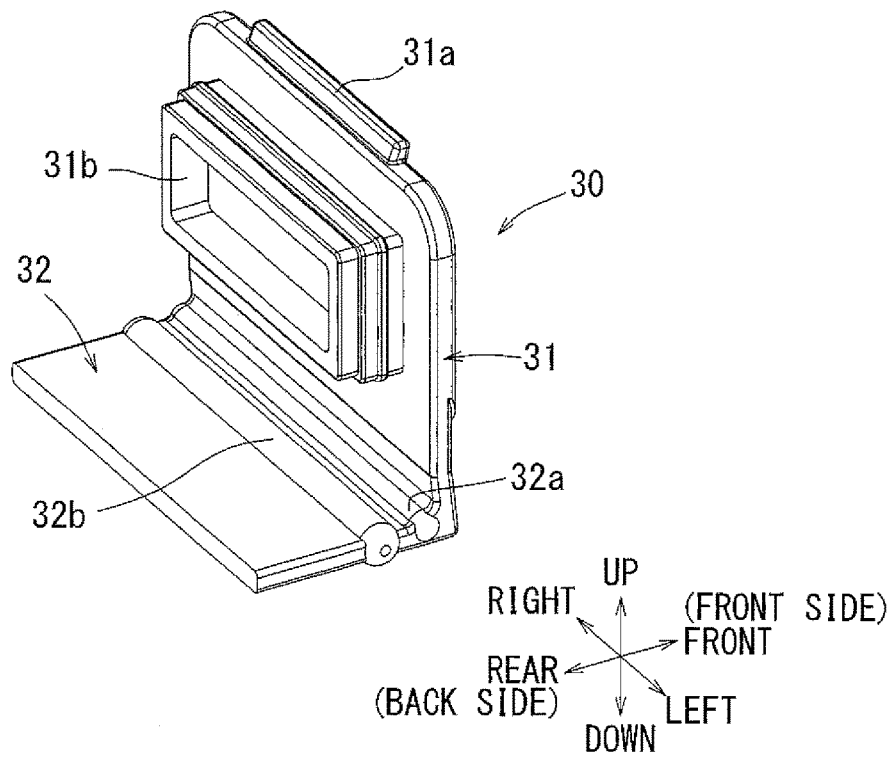
FIG. 9 is a rear-side perspective view of the waterproof cap.

As shown in FIGS. 6 and 7, a waterproof cap 30 may be fitted into the opening 2a of the connector body 21. For example, the waterproof cap 30 may be a one-piece mold product and may be made of a material, such as rubber, having an adequate elasticity. As shown in FIGS. 8 and 9, the waterproof cap 30 may include a body portion 31 and a support portion 32 each having a substantially rectangular flat-plate shape. The support portion 32 may extend from one of longer side edges (lower side edge in FIGS. 8 and 9) of the body portion 31 in a direction substantially perpendicular to the body portion 31, so that the waterproof cap 30 may have a substantially L-shape as viewed from the right side. A tab 31a may be formed on the upper edge of the body portion 31. The tab 31a may have an adequate shape to allow the user to pinch the tab 31b by his or her fingers. A seal portion 31b may be formed integrally with the rear surface of the body portion 31. The seal portion 31b may be configured to be capable of being fitted with the socket portion of the connector body 21. In the fitted state, the seal portion 31b may elastically contact the socket portion of the connector body 21, so that it may be possible to inhibit water from entering into the connector accommodation space 5A via the socket portion of the connector body 21. In addition, as the seal portion 31b is fitted into the socket portion of the connector body 21, a peripheral portion of the rear surface of the body portion 31 around the seal portion 31b may be elastically pressed against a portion of the body housing 2 around the opening 2a. Therefore, the opening 2a may be closed in a watertight manner.

A support hole 2c may be formed in the body housing 2 at a position on the lower side of the opening 2a and spaced from the opening 2a by a given distance. The support hole 2c may have a shape like a linear slot for allowing insertion of the support portion 32 of the waterproof cap 30. Therefore, with the support portion 32 inserted into the support hole 2c, the body portion 31 can move to open and close the socket portion of the connector body 21. In this connection, a front seal portion 32a and a rear seal portion 32b may be formed integrally with the support portion 32. Each of the front seal portion 32a and the rear seal portion 32b may have a substantially rod-like shape. The front seal portion 32a may extend along a joint portion between the body portion 31 and the support portion 32. The front seal portion 32a may have an upper portion protruding upward from the upper surface of the support portion 32 in a manner like a linear bulge. The rear seal portion 32b may be spaced rearward from the front seal portion 32a by a given distance and may extend parallel to the front seal portion 32a. The rear seal portion 32b may include an upper portion and a lower portion respectively protruding from the upper surface and the lower surface of the support portion 32. Each of the upper portion and the lower portion of the rear seal portion 32b may have a shape of a part of a circle in cross section. The distance between the front seal portion 32a and the rear seal portion 32b may be determined to be slightly smaller than the depth of the support hole 2c, i.e., the thickness of the front wall of the lower housing 4.

The support portion 32 may be inserted into the support hole 2c until the upper and lower portions of the rear seal portion 32b pass through the support hole 2c due to their elastic deformation. Therefore, the front seal portion 32a and the rear seal portion 32b may be positioned on opposite sides with respect to the support hole 2c. In this way, the waterproof cap 30 may be supported by the front wall of the body housing 2 via the support portion 32. In this state, the front seal portion 2a may be elastically pressed against the outer open edge of the support hole 2c of the front wall of the lower housing 4 from the outer side of the front wall. On the other hand, the rear seal portion 2b may be elastically pressed against the inner open edge of the support hole 2c from the inner side. As a result, the support hole 2c may be sealed by the front and rear seal portions 2a and 2b.

A recess 33 having a substantially semicircular shape in cross section may be formed in the outer surface of the front wall of the lower housing 4 along the upper portion of the outer open edge of the support hole 2c. Similarly, recesses 34 and 35 having a substantially semicircular shape may be formed in the inner surface of the front wall of the lower housing 4 along the upper and lower portions of the outer open edge of the support hole 2c. With this arrangement, it may be possible to increase the contact areas of the front and rear seal portions 32a and 32b with the front wall of the lower housing 4 around the support hole 2c. Therefore, it is possible to further reliably seal the support hole 2c for inhibiting water and dust from entering into the connector accommodation space 5A.

With the body portion 31 supported by the support portion 32 as described above, the body portion 31 may be pivoted upward to elastically fit the seal portion 31b with the socket portion of the connector body 21. At the same time, the body portion 31 may close the opening 2a of the body housing 2 as shown in FIG. 6. In this way, it is possible to prevent water and dust from entering into the connector accommodation space 5A via the connector body 21 or the opening 2a.

The user can easily open the body portion 31 of the waterproof cap 30 as shown in FIG. 7 by pinching the tab 31b by fingers and pivoting the body portion 31 downward. With the body portion 31 opened, the user can connect the external power cord to the connector body 21, so that an electric power can be supplied to the external device.

As described in connection with the first embodiment, even in the case that the waterproof cap 30 is not provided, water or dust may be discharged from the connector accommodation space 5A to the outside via the water discharge hole 5b even in the case that water or dust has accidentally entered into the connector accommodation space 5A via the connector body 21. Therefore, the power source circuit board 22 and the charge controllers 13 may be reliably prevented from being wetted or adhesion of dust. The waterproof cap 30 may serve to further reliably ensure that the power source circuit board 22 and the charge controllers 13 are prevented from being wetted or adhesion of dust

[Other Possible Modifications]

(1) In the above embodiments, the power supply connecter 20 is disposed at the front side of the body housing 2 at a position nearer to the right end of the front side. However, the power supply connector 20 may be disposed at any other position of the body housing 2. For example, the power supply connector 20 may be disposed at the front side of the body housing 2 at a position nearer to the left end of the front side or any other position along the front side. It may be also possible to dispose the power supply connector 20 at the upper side, the rear side, the right side or the left side of the body housing 2.

(2) In the above embodiments, the upper portion of the waterproof wall portion 5 of the lower housing 4 and the lower portion of the waterproof wall portion 9 of the lower housing 3 are overlapped with each other in the vertical direction. However, it may be possible to make such a modification that the upper portion of the waterproof wall portion 5 of the lower housing 4 and the lower portion of the waterproof wall portion 9 of the lower housing 3 do not overlap with each other. For example, the upper end edge of the waterproof wall portion 5 and the lower end edge of the waterproof wall portion 9 may directly contact with each other in face-to-face contact relationship. Alternatively, a seal member, such as a rubber seal member may be interposed between the upper end edge of the waterproof wall portion 5 and the lower end edge of the waterproof wall portion 9. This arrangement can further enhance the waterproof function for the connector accommodation space 5A.

(3) In the above embodiments, the waterproof wall portion 5 of the lower housing 4 and the waterproof wall portion 9 of the upper housing 3 are provided. However, the waterproof wall portion 9 of the upper housing 3 may be eliminated. In such a case, in order to enhance the waterproof function, it may be preferable that the waterproof wall portion 5 extends vertically upward to a position where the upper end edge of the waterproof wall portion 5 contacts the top wall of the upper housing 3 or is positioned proximal to the top wall of the upper housing 3.

(4) In the above embodiments, a USB (Universal Serial Bus) connector having a type-A female terminal was described as an example of the power supply connector 20 for supplying an electric power to the external device. However, any other connectors than the USB connector can be used as the power supply connector 20.

(5) In the above embodiments, the battery charger 1 is configured to be capable of simultaneously recharging two battery packs B. However, the teachings of the above embodiments can be also applied to a battery charger designed for recharging only one battery or a battery charger designed for simultaneously recharging three or more battery packs.

(4) In the second embodiment, the body portion 31 of the waterproof cap 30 is pivoted vertically for opening and closing the socket portion of the power supply connector 20. However, it may be possible to modify such that the body portion 31 pivots leftward and rightward for opening and closing the socket portion.

(5) In the above embodiments, the power source circuit board 22 having the power source circuit is located so as to be spaced from the charge controllers 13. However, it may be possible to mount the power source circuit to a circuit board of one of the charge controllers 13, such as the charge controller 13 positioned on the right side as viewed in FIG. 2. In this way, a single circuit board can be commonly used for the charge controller 13 and the power source circuit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved battery chargers, and methods of making and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A battery charger usable for recharging a battery pack, comprising:
   a body housing including an upper side, a lower side, and a lateral side;
   a battery mount portion disposed at the upper side of the body housing,
   wherein the battery mount portion is configured such that (a) the battery pack is moved relative to the battery mount portion in a battery mounting direction for mounting to the battery mount portion, and (b) the battery pack is moved relative to the battery mount portion in a removing direction for removing from the battery mount portion; and
   a power supply connector capable of outputting a DC electric power and disposed at at least one of a first position and a second position of the lateral side of the battery housing, the first position being located on the side of the mounting direction, and the second position being located on the side of the removing direction.

2. The battery charger according to claim 1, wherein:
   the battery mount portion is configured such that the battery pack is mounted to and removed from the battery mount portion as the battery pack moves in the mounting direction and the removing direction along the upper side of the battery pack.

3. The battery charger according to claim 1, wherein:
   the power supply connector is disposed at the first position; and
   the mounting direction and the removing directions are opposite to each other.

4. The battery charger according to claim 1, further comprising an AC power cord extending outward from the body housing.

5. The battery charger according to claim 4, wherein:
   the power supply connector is disposed at the first position; and
   the first position is proximal to the AC power cord with respect to a direction perpendicular to the mounting direction of the battery pack.

6. The battery charger according to claim 4, wherein:
   the power supply connector is disposed at the second position; and
   the second position is proximal to the AC power cord with respect to a direction perpendicular to the removing direction of the battery pack.

7. The battery charger according to claim 4, wherein:
   the lateral side includes a front side, a rear side, a right side and a left side;
   the first position is located at the front side;
   the second position is located at the rear side; and
   the AC power cord extends from one of the right side and the left side.

8. The battery charger according to claim 1, wherein:
   the body housing comprises an upper housing and a lower housing joined together at a joint plane, and
   the power supply connector is disposed proximal to or across the joint plane.

9. The battery charger according to claim 1, further comprising:
   a power source circuit board connected to the power supply connector, wherein the power source circuit board and the power supply connector are parts of a power supply device;
   a circuit board accommodation space defined in the body housing and configured to accommodate the power source circuit board;
   a connector accommodation space defined in the body housing and configured to accommodate the power supply connector; and
   a waterproof wall portion disposed within the body housing and configured to partition between the circuit board accommodation space and the connector accommodation space in a waterproof manner.

10. The battery charger according to claim 9, further comprising a waterproof cap, wherein the waterproof cap comprises:
    a body portion capable of closing the power supply connector in a water-tight manner; and
    a support portion configured to support the body portion with respect to the body housing, wherein:
    the support portion is capable of being inserted into a support hole formed in the body housing to extend therethrough; and
    the support portion includes an outer seal portion and an inner seal portion configured to engage the support hole from an outer side and an inner side of the support hole so as to close the support hole in a water-tight manner.

11. A battery charger usable for recharging a battery pack, comprising:
    a body housing including an upper side, a lower side, a front side, a rear side, a right side and a left side; and
    a battery mount portion disposed at the upper side of the body housing,
    wherein the battery mount portion is configured such that (a) the battery pack is moved relative to the battery mount portion in a battery mounting direction from the rear side toward the front side of the body housing for mounting to the battery mount portion, and (b) the battery pack is moved relative to the battery mount portion in a removing direction from the front side toward the rear side of the body housing for removing from the battery mount portion; and
    a power supply connector capable of outputting a DC electric power and disposed at at least one of a first position and a second position of a lateral side of the battery housing, the first position being located on the side of the mounting direction, and the second position being located on the side of the removing direction.

12. A battery charger usable for recharging a battery pack, comprising:
a body housing:
a power supply device comprising a power source circuit board and a power supply connector;
a circuit board accommodation space defined in the body housing and configured to accommodate the power source circuit board;
a connector accommodation space defined in the body housing and configured to accommodate the power supply connector; and
a waterproof wall portion disposed within the body housing and configured to partition between the circuit board accommodation space and the connector accommodation space in a waterproof manner.

13. The battery charger according to claim 12, wherein the power supply device is configured to supply a DC power.

14. The battery charger according to claim 12, wherein:
the body housing includes an upper housing and a lower housing joined together to form the body housing;
the waterproof wall portion includes an upper waterproof wall portion disposed at the upper housing and a lower waterproof wall portion disposed at the lower housing; and
at least a part of the upper waterproof wall portion and at least a part of the lower waterproof wall portion are overlapped with each other in a vertical direction.

15. The battery charge according to claim 14, wherein:
the at least a part of the upper waterproof wall portion is positioned on the side of the power supply connector with respect to the at least a part of the lower waterproof wall portion.

16. The battery charger according to claim 12, wherein a water discharge hole is formed in a part of the body housing defining a bottom of the connector accommodation space.

17. The battery charger according to claim 12, further comprising a waterproof cap, wherein the waterproof cap comprises:
a body portion capable of closing the power supply connector in a water-tight manner; and
a support portion configured to support the body portion with respect to the body housing, wherein:
the support portion is capable of being inserted into a support hole formed in the body housing to extend therethrough; and
the support portion includes an outer seal portion and an inner seal portion configured to engage the support hole from an outer side and an inner side of the support hole so as to close the support hole in a water-tight manner.

18. The battery charger according to claim 17, wherein:
the body housing includes an outer side recess and an inner side recess respectively formed along an outer side open edge and an inner side open edge of the support hole; and
the outer side recess and the inner side recess are configured to be respectively fitted with the outer seal portion and the inner seal portion of the support portion.

19. The battery charger according to claim 17, wherein at least the support portion of the waterproof cap has elasticity.

20. The battery charger according to claim 17, wherein the support hole is formed in communication with the connector accommodation space.

21. The battery charger according to claim 1,
wherein the first position is located on the side of the mounting direction such that the first position is located to a side of the body housing that the mounting direction is directed towards, and
wherein the second position is located on the side of the removing direction such that the second position is located to a side of the body housing that the removing direction is directed towards.

22. The battery charger according to claim 11, wherein the lateral side includes the front side, the rear side, the right side and the left side.

* * * * *